Nov. 14, 1950     A. J. H. CROOK     2,530,292
HOOK TO GUT HOLDER
Filed July 2, 1945

INVENTOR
ARTHUR JOHN HOWARD CROOK
BY
ATTORNEY

UNITED STATES PATENT OFFICE 2,530,292

HOOK TO GUT HOLDER

Arthur John Howard Crook, Havelock, Ontario, Canada, assignor to Canada Needle and Fishing Tackle Company Limited, Toronto, Ontario, Canada Application July 2, 1945, Serial No. 602,859
In Canada September 21, 1944

1 Claim. (Cl. 43—57.5)

My invention relates to hook to gut holders.

The objects of the invention are to provide a small, compact and convenient holder or container for hook to guts, which will store the guts in individual compartments and prevent tangling thereof.

A specific object of the invention is to so form the device, and more particularly, the casing, that the hooks will be firmly held in place, with the sharp ends of the hooks covered, while the hooks are sufficiently exposed to enable one readily to appreciate their sizes and permit of quick selection and removal.

Figure 1:
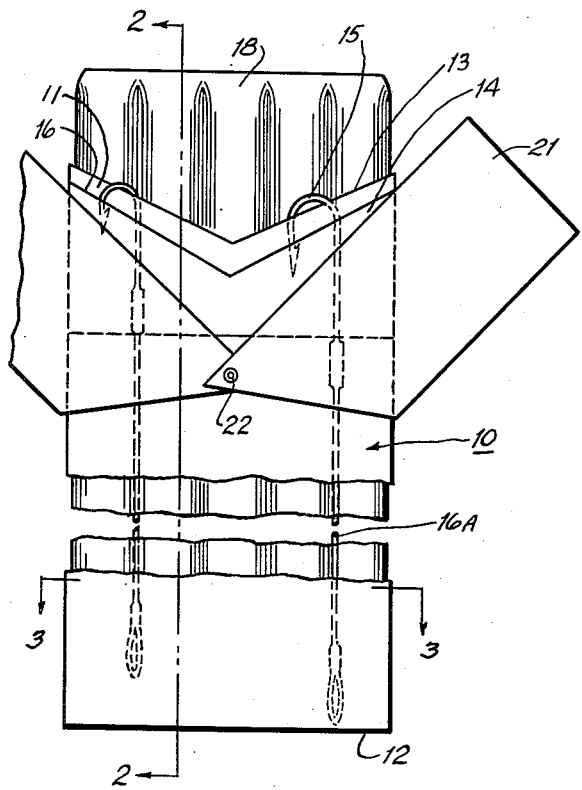
Figure 3:
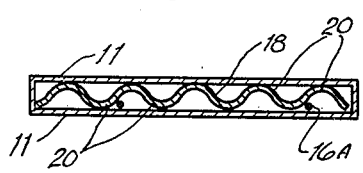
Figure 2:
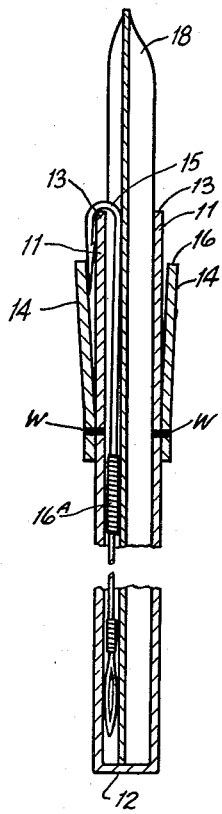

In the drawings, wherein like numerals of reference indicate corresponding parts in the various figures, Figure 1 is a view in elevation of a holder for hook to guts made in accordance with the present invention, the casing being partly broken away;

Figure 2 is a section on line 2—2 in Figure 1, on an enlarged scale, the closure means being omitted; and, Figure 3 is a section on line 3—3 in Figure 1.

Referring now by numerals to the drawings, 10 is the casing of the device. The casing, which is shallow so that it may fit easily and comfortably in one's pocket without taking much room, is of a length chosen to accommodate the guts without folding.

The casing includes front and rear walls 11 and a bottom wall 12, and is open at the top. The open end of the casing, at the front and rear walls 11, is defined by edges 13, preferably formed or slanted as shown in Figure 1. The casing includes, adjacent its open end, auxiliary walls 14 parallel with the front and rear walls, so mounted as to be capable of being moved slightly away therefrom to permit of inserting the points or sharp ends of the hooks 15 of the guts 16A between the auxiliary walls and their respective adjacent or associated front and rear walls. The sharp ends of the hooks will thus be covered and this will minimize the likelihood of injury to one's fingers.

Preferably, as shown in Figure 2, when the casing is made of metal, the auxiliary walls also made of metal, are secured to the front and rear walls adjacent the lower edges of the auxiliary walls, say by spot welding, W, so as to leave the upper remaining portion of the auxiliary walls free to be moved away from their adjacent, associated front and rear walls respectively. At the same time the hooks will be held sufficiently firmly in place by the resiliency of the auxiliary walls, which tend to engage their associated walls.

The auxiliary walls are preferably of such depth that their upper free edges 16 are spaced downwardly from the edges 13 of the walls 11. Preferably also, the edges 16 are not parallel with the edges 13 so that the distance between such edges increases from the ends thereof toward the centre and then decreases, to take care of hooks of different sizes. As will be readily seen, the hooks are exposed above the lower edges 13 and this permits of readily gauging or appreciating the sizes of the various hooks, and of easily grasping the selected hook for removal from the holder.

Within the casing is a partition 18 adapted to provide spaced, individual compartments each receiving a hook to gut. The partition extends beyond or out of the casing, through its open end. Conveniently, as shown, the partition may be made of a corrugated metal plate, the apices 20 of which engage the adjacent front and rear walls respectively.

The casing is closed by a two-section lid 21 pivoted to the casing on a common axis, constituted of suitable rivets 22. The rivets preferably are located below the auxiliary walls so that the lid sections will be held closed by friction.

What I claim is:

A holder for hook to guts comprising an elongated shallow casing having an upper open end and including front and rear parallel walls, a partition in said casing defining with said walls spaced parallel compartments adapted to hold individual hook to guts lengthwise therein, at least one auxiliary flat wall secured along a transverse lower portion to the outside of one of said walls leaving its remaining upper portion free resiliently to be flexed away from said one of said walls to receive and clamp therebetween the points of the hooks emerging out of said casing over the open end thereof, the upper edge of said auxiliary wall being spaced downwardly from the upper edge of said one of said walls to expose portions of the hooks and in non-parallel relationship to said upper edge to provide for hooks of different sizes, and a closure for the upper end of said casing.

ARTHUR JOHN HOWARD CROOK.

REFERENCES CITED

The following references are of record in the file of this patent:

UNITED STATES PATENTS

| Number | Name | Date |
|---|---|---|
| 667,676 | Cantrell | Feb. 12, 1901 |
| 1,133,542 | Deal | Mar. 30, 1915 |
| 1,744,104 | Carroll | Jan. 21, 1930 |